US006251358B1

United States Patent
Lailach et al.

(10) Patent No.: US 6,251,358 B1
(45) Date of Patent: *Jun. 26, 2001

(54) PROCESS FOR THE PREPARATION OF SODIUM FLUORIDE

(75) Inventors: Günter Lailach, Krefeld; Andreas Bulan, Langenfeld; Günter Buss, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/364,473

(22) Filed: Jul. 30, 1999

(30) Foreign Application Priority Data

Aug. 1, 1998 (DE) .............................. 198 34 833

(51) Int. Cl.$^7$ ...................................... C01D 3/02
(52) U.S. Cl. ..................... 423/490; 423/499.1; 23/301
(58) Field of Search ................. 423/490, 499.1; 23/301

(56) References Cited

U.S. PATENT DOCUMENTS 3,660,019 * 5/1972 Predikant et al. ................. 23/88
5,470,559 * 11/1995 Grolman et al. ................. 423/489
5,531,975 * 7/1996 Erickson et al. ................. 423/319

FOREIGN PATENT DOCUMENTS

| 220 587 | 4/1985 | (DE) . |
| 575270 | * 3/1945 | (GB) . |
| 71-003253 | 4/1971 | (JP) . |

OTHER PUBLICATIONS

Remy, Lehrbuch der Anor. Chem. [Textbook of Inorganic Chemistry] vol. 1, 11$^{th}$ edition, Leipzig (month unavailable) 1960, pp. 933–934 Halogenide: Allgemeines.—Fluoride.

* cited by examiner

Primary Examiner—Steven P. Griffin
Assistant Examiner—Christina Ildebrando
(74) Attorney, Agent, or Firm—Joseph C. Gil; Diderico van Eyl

(57) ABSTRACT

Process for the preparation of sodium fluoride from sodium hydroxide solution and hydrogen fluoride or hydrofluoric acid, characterized in that <45% strength by weight, preferably 20 to 40% strength by weight, sodium hydroxide solution and hydrogen fluoride or hydrofluoric acid are introduced separately into a saturated NaF solution in which 4 to 50% by weight, preferably 5 to 30% by weight, of solid NaF are suspended and whose temperature is in the range from 20 to 80° C., preferably 30 to 60° C.

6 Claims, 2 Drawing Sheets

PROCESS FOR THE PREPARATION OF SODIUM FLUORIDE

FIELD OF THE INVENTION

The invention relates to a process for the continuous preparation of sodium fluoride from sodium hydroxide solution and hydrogen fluoride or hydrofluoric acid.

BACKGROUND OF THE INVENTION

It is known to prepare sodium fluoride by reacting sodium carbonate or sodium hydroxide with hydrofluoric acid. In this reaction, separating off the solid NaF from the mother liquor comprising from 4 to 5% by weight NaF in dissolved form can be improved by adding alcohol (Ullmann's Encyclopedia of Ind. Chem., 5th Ed., 1997, Wiley VCH, Weinheim). According to Remy, Lehrbuch der Anorg. Chem. [Textbook of Inorganic Chemistry] volume 1, 11th Edition, Leipzig, 1960, p. 933, on the introduction of hydrogen fluoride into dilute sodium hydroxide solution or sodium carbonate solution, NaF precipitates out as a white precipitate.

The industrial preparation is preferably performed from the less costly raw materials cryolite (Remy) or hexafluorosilicic acid (JP-A 71-03253, DD-A 220 587).

For the production of pure sodium fluoride, as is required, for example, for the preparation of pharmaceutical compositions and toothpaste, and for adding to drinking water, pure sodium hydroxide solution and hydrogen fluoride purified by distillation, which can be used in anhydrous form or as aqueous hydrofluoric acid, are suitable in particular. In this process, the use of 50% strength sodium hydroxide solution and hydrogen fluoride offers the advantage that, owing to the heat of reaction, virtually all the water evaporates and thus no costs arise for working up the mother liquor. However, the industrial implementation of the process is highly problematic because of the corrosivity of the reactants at the high process temperature and the high solids content in the reaction mixture. In addition, sodium hydroxide solution which, in contrast to the traditional amalgam process, in which it arises directly as a 50% strength lye, in the modern membrane process, in which it arises as a 30 to 32% strength by weight lye, must be concentrated with relatively high expenditure to 50% by weight NaOH content. Likewise, hydrofluoric acid arises in various processes in high purity as a dilute acid, which is suitable in principle for NaF preparation.

The use of less costly sodium hydroxide solution of low concentration or aqueous hydrofluoric acid is opposed by the fact that, in their reaction, relatively large amounts of mother liquor containing 4 to 5% by weight of dissolved NaF arise, the partial precipitation of which by adding alcohol would not simplify the problems of disposal.

The object of the present invention is to provide a process which is expedient from economic and ecological aspects for preparing sodium fluoride, which process, in particular, also permits the use of the raw materials diluted to a greater or lesser extent.

SUMMARY OF THE INVENTION

According to the invention, NaF is prepared by separate introduction of dilute sodium hydroxide solution and hydrogen fluoride or hydrofluoric acid into a saturated NaF solution which comprises 4 to 50% by weight of solid NaF at 20 to 80° C.

The invention relates to a process for the preparation of sodium fluoride from sodium hydroxide solution and hydrogen fluoride or hydrofluoric acid, characterized in that <45% strength by weight, preferably 20 to 40% strength by weight, sodium hydroxide solution and hydrogen fluoride or hydrofluoric acid are introduced separately into a saturated NaF solution in which 4 to 50% by weight, preferably 5 to 30% by weight, of solid NaF are suspended and whose temperature is in the range from 20 to 80° C., preferably 30 to 60° C.

DESCRIPTION OF THE FIGURES

These and other features, aspects, and advantages of the present invention will become better understood with reference to the following description and appended claims, where:

DESCRIPTION OF THE INVENTION

To maintain a preferably constant reaction temperature, water is evaporated from the reaction mixture, preferably under vacuum. The heat of reaction released during the NaF formation is completely utilized here in particular for evaporating water. In order to evaporate water additionally introduced together with the reactants, the reactor is preferably heated by steam. From the reactor, suspension is taken off, preferably continuously, to separate off the NaF formed. The solids are separated off preferably by filtration or centrifugation. The mother liquor produced in this operation is preferably returned to the reactor.

The heating of the reactor by steam is preferably set in such a manner that the working volume in the system is kept constant. The reactor used can be a stirred tank or, preferably, a vacuum forced-circulation evaporator corresponding to FIG. 1. Surprisingly, it has been found that when a forced-circulation evaporator is used with a given plant capacity, the particle size of the NaF produced can be varied within broad limits by changing the volumetric flow rate pumped in the circuit. The greater the volumetric flow rate, the coarser the NaF produced. The reactants are fed separately, preferably into the forced circulation line upstream or downstream of the circulation pump.

Figure 2:
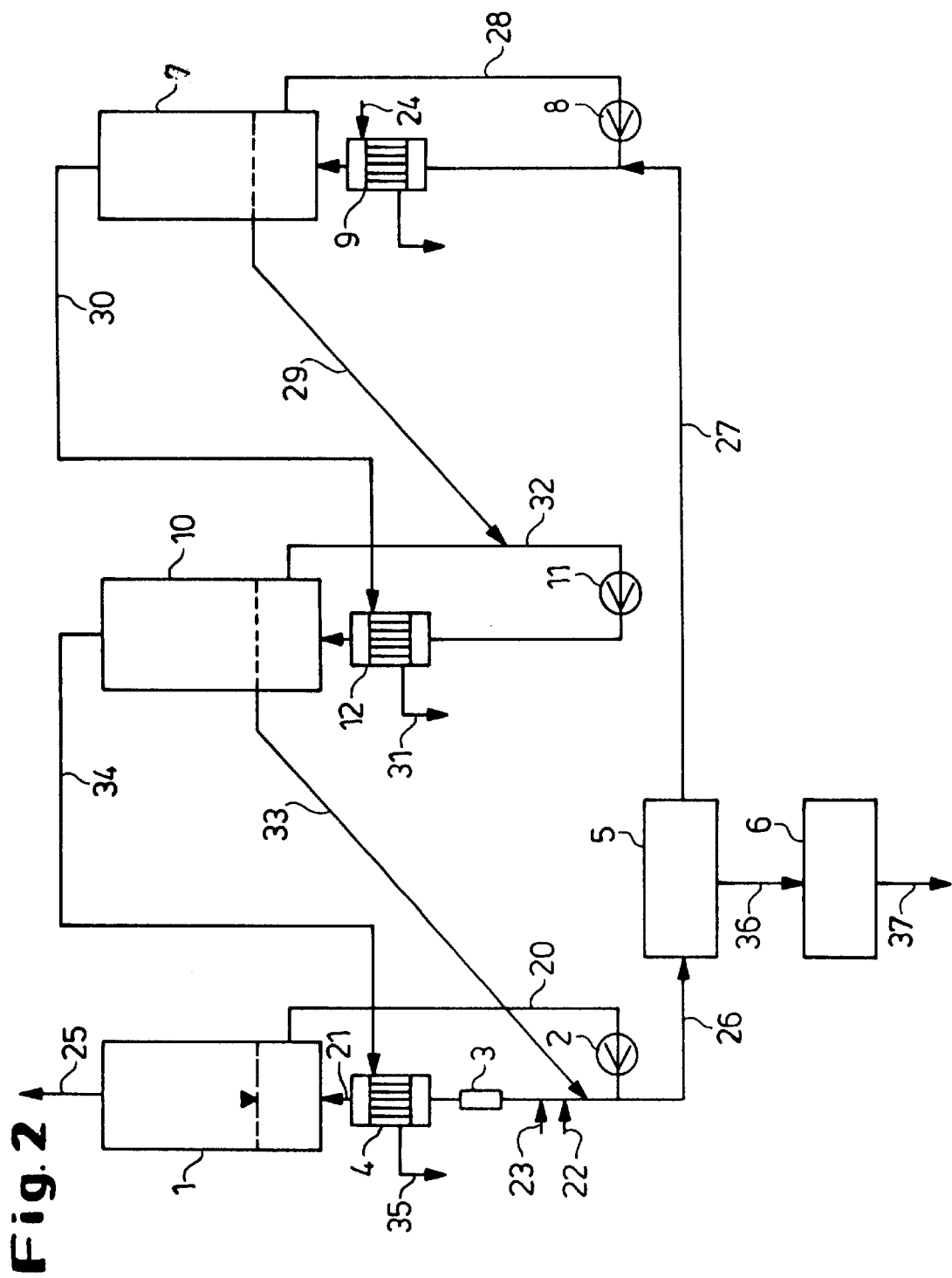
FIG. 2 is a diagram corresponding to a system for producing NaF from relatively high dilute sodium hydroxide solution and/or hydrofluoric acid.

When relatively highly dilute sodium hydroxide solution and/or hydrofluoric acid is used, it is economically advantageous to use a multistage, preferably two- or three-stage, forced-circulation evaporator system, as is shown, for example, in FIG. 2. In particular mother liquor is evaporated in a first steam-heated stage at 80 to 120° C. The vapours from the first stage heat, in a three-stage system, the heat exchanger of the second evaporation stage, in which the mother liquor is further evaporated. The partially evaporated mother liquor, which comprises solid NaF in suspension, is recycled to the reactor, the heat exchanger of which is heated by vapours from the second evaporation stage, or, in the case of two-stage systems, from the first evaporation stage. The reaction conditions in the reactor are the same as described above for single-stage systems.

Preferred embodiments of the process according to the invention are to be described in more detail with reference to FIGS. 1 and 2.

Figure 1:
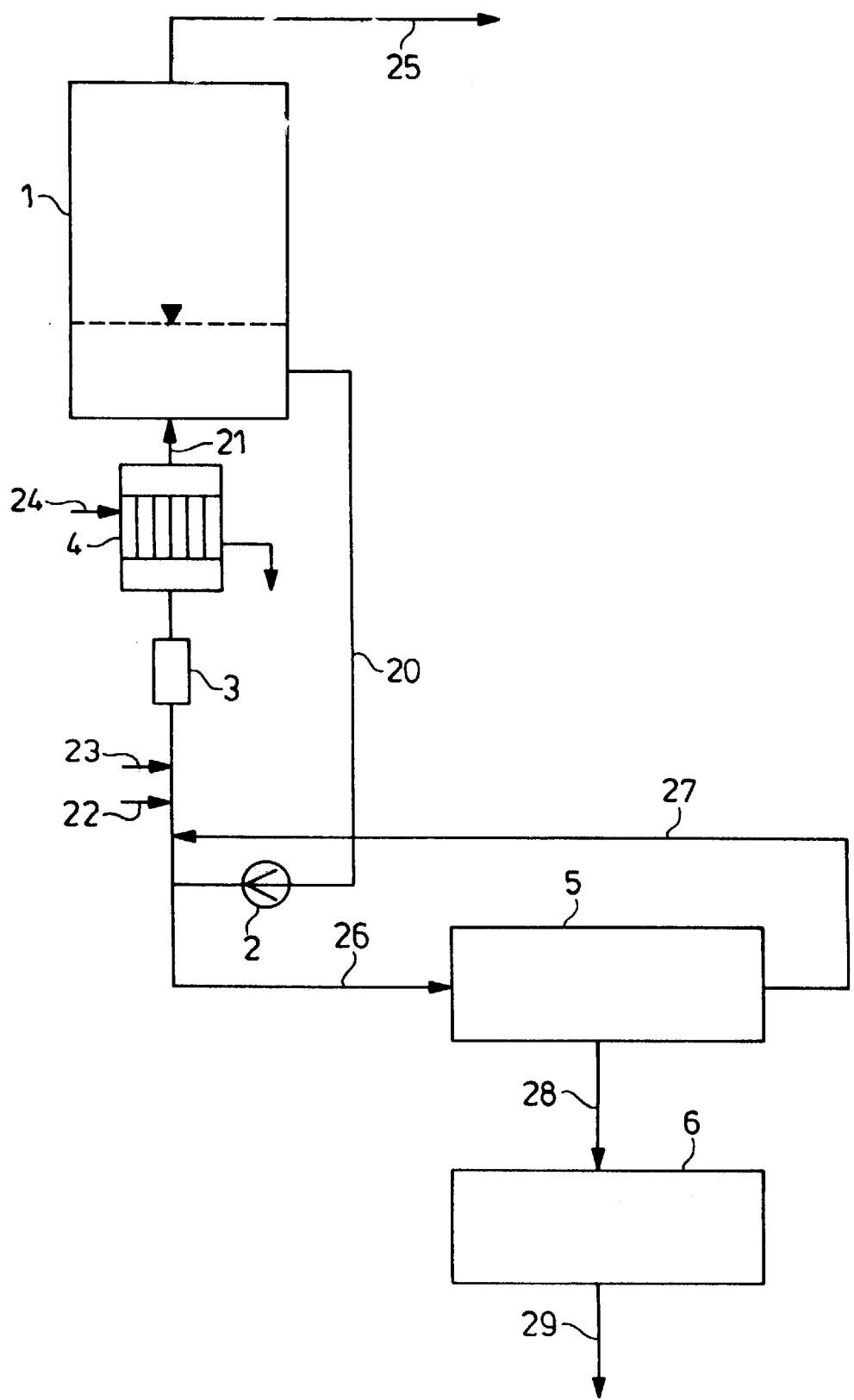
FIG. 1 is a diagram that depicts a plant producing NaF from sodium hydroxide and hydrofluoric acid of relatively high concentration.

FIG. 1 relates to the diagrammatic depiction of a plant for producing NaF from sodium hydroxide solution and hydrofluoric acid of relatively high concentration.

The reactor of a vacuum forced-circulation evaporator type consists of the vapour dome (1), the circulation pump (2), preferably a static mixer (3) and a heat exchanger (4). By means of pump (2), the NaF suspension (20) is transported in the circuit at a volumetric flow rate such that the temperature difference between the suspension (20) flowing from the vapour dome (1) and the suspension (21) entering the vapour dome is 3 to 50 K, preferably 5 to 20 K. At a plant capacity of 1 t of NaF/h, the circulated volumetric flow rate is in the range from 15 to 300 m$^3$/h, preferably 40 to 200 m$^3$/h, depending on the NaF particle size distribution required. Sodium hydroxide solution (22) and hydrogen fluoride or hydrofluoric acid (23) are introduced separately into the circulated suspension. The static mixer (3) ensures the complete reaction of the reaction partners. In the heat exchanger (4), the suspension temperature is increased by heating steam (24) to the extent that, owing to the evaporation of water in the vapour dome (1), the total working volume in the system is kept constant. The evaporated water (25) is passed into a vapour condensation system consisting of condenser and vacuum pump, the temperature of which system is set so that the suspension (20) has a temperature in the range from 20 to 60° C., preferably 30 to 50° C. From the circuit of the recirculated NaF suspension, a partial stream (26) is taken off for separating off the NaF formed. The NaF can be separated off (5) from the mother liquor by centrifugation or, preferably, vacuum filtration. The mother liquor (27) is recirculated to the suspension circuit of the reactor. The NaF filter cake (28) is fed into a dryer (6) from which the dried pure NaF (29) is discharged.

In the production of NaF from relatively highly dilute sodium hydroxide solution and/or hydrofluoric acid, a system corresponding to FIG. 2 is preferred. The actual NaF production is carried out in the same manner as described with reference to FIG. 1, with the difference that heat exchanger (4) is not heated by heating steam (24), but by vapours (34) from the evaporation of mother liquor, and that the mother liquor (27) arising in the NaF separation (5) is not recirculated directly to the reactor, but is partially evaporated in advance. The mother liquor evaporation takes place here, for example, in two stages. In the first evaporation stage an NaF solution (28) possibly comprising small amounts of solid NaF is pumped in the circuit through the heat exchanger (9) and the vapour dome (7) by means of pump (8). In the heat exchanger (9) heated by heating steam (24), the liquid is heated to 90 to 130° C. and, in the vapour dome (7), cooled back to 80 to 100° C. by evaporation of water. The amount of mother liquor (29) decreased by the amount of evaporated water flows into the second evaporation stage.

The vapours (30) are passed from the vapour dome (7) to the heat exchanger (12) of the second evaporation stage from which they flow off as condensate (31).

In the second evaporation stage, an NaF suspension (32) having a low solids content is circulated by means of pump (11). The temperature of the NaF suspension (33) flowing off from the second evaporation stage to the NaF reactor is in the range from 50 to 90° C. The vapours (34) formed in the vapour dome (10) are passed into the heat exchanger (4) of the NaF reactor, from where they flow off as condensate (35).

The process according to the invention offers a plurality of advantages

The reactants sodium hydroxide solution and hydrogen fluoride or hydrofluoric acid are immediately highly diluted and well mixed in the relatively cold suspension circuit.

The low reaction temperature makes possible the use of inexpensive plant components.

The heat of reaction is utilized completely for water evaporation.

The low temperature of the NaF suspension makes possible the interferencefree and effective separation of the mother liquor from the NaF produced.

The evaporation of the mother liquor in single-stage or multistage forced-circulation evaporators is problem-free.

Combining the mother liquor evaporation with the NaF reactor minimizes use of technical resources and energy consumption.

For a given plant capacity, when a forced-circulation evaporator is used as reactor, by changing the volumetric flow rate pumped in the circuit, the fineness of the NaF produced can be set in accordance with the requirement.

The advantages of the invention are to be illustrated by the following examples, without thereby restricting the scope of the invention. The parts and percentages specified in the examples refer to weight, unless otherwise stated.

EXAMPLES

Example 1

NaF is prepared from 32% strength sodium hydroxide solution and hydrogen fluoride in a reactor designed as vacuum forced-circulation evaporator according to FIG. 1.

Pump (2) transports 82 t/h of a suspension which comprises 18.2% of solid NaF (stream 20). 2500 kg/h of 32% strength NaOH (22) and 400 kg/h of liquid hydrogen fluoride (23) are passed into the partial stream which is returned to the vapour dome (1). Owing to the heat of reaction, the temperature of the suspension increases from 35 to 43° C. After the reaction has proceeded completely during flow through the static mixer (3), the suspension is heated in the heat exchanger (4) from 43 to 51° C., 1 t/h of 5 bar steam (24) as heating medium being consumed. The suspension (21) fed into the vapour dome (1) at 51° C. is cooled to 35° C. by the evaporation of 1.9 t/h of water. The vapours (25) are condensed in a heat exchanger using cooling water. The condensate flowing off at 32° C. comprises approximately 50 ppm of F ions.

Downstream of pump (2), a partial stream (26) of the suspension (20) is taken off and passed to the vacuum rotating drum filter (5). There, 960 kg/h of filter cake (28) containing 14.6% moisture are separated off from 4500 kg/h suspension. 3540 kg/h of mother liquor (27) flow back to the NaF reactor. On drying (6) the filter cake (28), 840 kg of NaF (29) are produced.

Example 2

NaF is prepared from 32% strength NaOH and 25% strength hydrofluoric acid. The reactor used is a vacuum forced-circulation evaporator system as in Example 1. The water additionally introduced together with the reactants is removed from the system by evaporating the mother liquor. In a plant corresponding to FIG. 2, in the NaF reactor, 55 t/h of a suspension (20) of 16% NaF in saturated NaF solution (temperature 35° C.) are pumped by pump (2). 2500 kg/h of 32% strength sodium hydroxide solution (22) and 1600 kg/h of 25% strength hydrofluoric acid (23) are fed into the partial stream flowing back to the vapour dome (1). Owing to the heat of reaction and the heat of condensation of the vapours

(34) transferred in the heat exchanger (4) from the mother liquor evaporation stage II, the suspension (21) heats up to 50° C. At a pressure of 55 mbar, 1380 kg/h of water (25) evaporate in the vapour dome (1), which water is condensed in the vapour condenser.

From the suspension stream (20) pumped by pump (2), 5410 kg/h (26) are passed to the vacuum rotating drum filter (5). There, 1000 kg/h of filter cake (36) having a moisture content of 16% are produced, which are dried in a pneumatic dryer (6) from which 840 kg of NaF are discharged (37).

The 4410 kg/h of NaF-saturated mother liquor (27) which arise in the filtration (5) are fed into the mother liquor stream (28) (30 t/h, 87° C.) which is transported by pump (8) and are heated up in the heat exchanger (9) to 100° C. by 1.25 t/h of 5-bar steam (24). In the vapour dome (7), 820 kg/h of water (30) evaporate at 630 mbar pressure, which are passed as heating medium into the heat exchanger (12). At the same time, 3610 kg/h of mother liquor (29) flow into the circuit of the mother liquor evaporation stage II. 56 t/h of a suspension of 2.5% NaF in NaF-saturated mother liquor are recirculated by pump (11), which are heated to 75° C. in the heat exchanger (12). In the condensation of the vapours (30) serving as heating medium, 820 kg/h of condensate (31) arise. In the vapour dome (10), the suspension is cooled (32) from 75 to 65° C. at a pressure of 250 mbar. 2690 kg/h of the mother liquor (33) concentrated to form a suspension flow into the NaF reactor. The 920 kg/h of water (34) evaporated in the vapour dome (10) are condensed in the heat exchanger (4) and discharged as condensate (35). Although the present invention has been described in detail with reference to certain preferred versions thereof, other variations are possible. Therefore, the spirit and scope of the appended claims should not be limited to the description of the versions contained therein.

What is claimed is:

1. Process for preparing sodium fluoride from a sodium hydroxide solution and hydrogen fluoride or hydrofluoric acid, wherein a <45% strength by weight sodium hydroxide solution and hydrogen fluoride or hydrofluoric acid are introduced separately into a reactor containing a saturated NaF solution in which 4 to 50% by weight of solid NaF is suspended and whose temperature is in the range from 20 to 80° C.

2. Process according to claim 1, wherein a mother liquor arising in separation of NaF formed is recirculated to the reactor.

3. Process according to claim 1, wherein the particle size of the NaF is increased by increasing a volumetric flow rate of the saturated NaF solution having solid NaF suspended therein pumped in the circuit or is decreased by decreasing the volumetric flow rate.

4. Process according to claim 1, wherein per t of NaF production/h, a volumetric flow rate in the range from 15 to 300 $m^3$/h of the saturated NaF solution having solid NaF suspended therein is recirculated.

5. Process according to claim 1, characterized in that the heat exchanger of the reactor is heated by heating steam or vapours from a mother liquor evaporation.

6. The process of claim 1, wherein the reactor is a vacuum forced-circulation evaporator comprising a vapor dome, a circulation pump, a heat exchanger, a vapor condensation system, and a static mixer, wherein the sodium hydroxide solution and a hydrogen fluoride or hydrofluoric acid are fed separately upstream of the circulation pump.

* * * * *